M. KRETCHMER.
TRACTOR LUG.
APPLICATION FILED MAY 6, 1921.

1,420,712.

Patented June 27, 1922.

Mathias Kretchmer.
INVENTOR

BY Victor J. Evans
ATTORNEY

WITNESS:
George L. Ljungloff.

M. KRETCHMER.
TRACTOR LUG.
APPLICATION FILED MAY 6, 1921.
1,420,712.
Patented June 27, 1922.
2 SHEETS—SHEET 2.
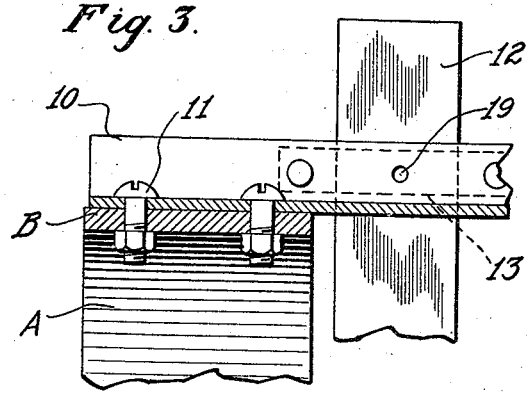
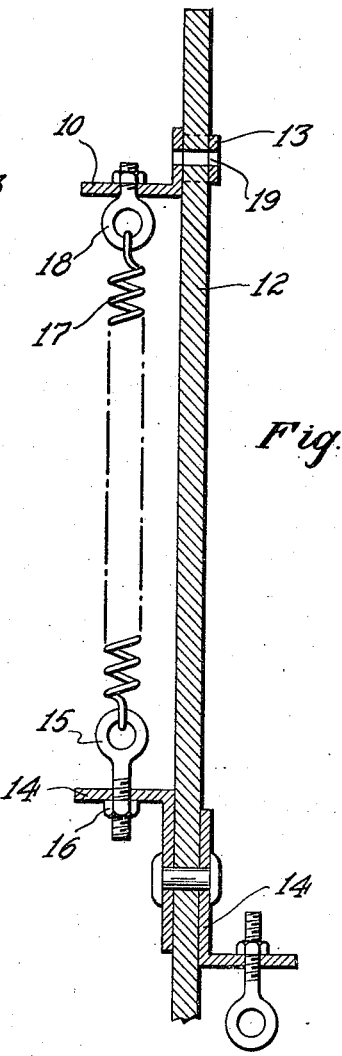
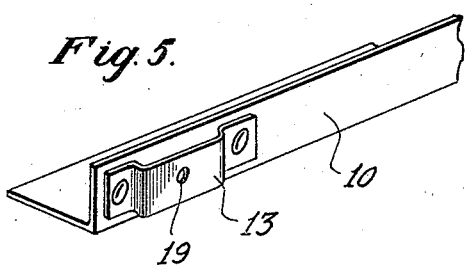
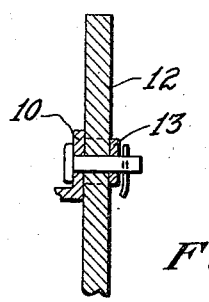
Mathias Kretchmer.
INVENTOR
BY Victor J. Evans
ATTORNEY
WITNESS:

UNITED STATES PATENT OFFICE.

MATHIAS KRETCHMER, OF ORISKA, NORTH DAKOTA.

TRACTOR LUG.

1,420,712.   Specification of Letters Patent.   Patented June 27, 1922.

Application filed May 6, 1921. Serial No. 467,403.

*To all whom it may concern:*

Be it known that I, MATHIAS KRETCHMER, a citizen of the United States, residing at Oriska, in the county of Barnes and State of North Dakota, have invented new and useful Improvements in Tractor Lugs, of which the following is a specification.

This invention relates to traction devices, particularly to a tractor lug device formed as an attachment to a tractor wheel whereby to insure traction in soft or muddy ground.

An important and more specific object is the provision of a tractor lug device which may be secured upon an ordinary traction wheel when necessary without making any alterations therein except to provide holes for the passage of securing bolts or the like, my device including supporting elements engaged upon the wheel and with which are slidably associated transverse lug members normally spring-pressed so as to extend beyond the periphery of the wheel for penetrating engagement with the ground.

Another object is the provision of a device of this character which is so constructed that the slidable lug members may be held rigid when desired.

An additional object is the provision of an attachment of this character which will be simple and inexpensive in manufacture, easy in installation, efficient in use, positive in action, durable in service, and a general improvement in the art.

With the above and other objects and advantages in view, the invention consists in the details of construction to be hereinafter more fully described and claimed and illustrated in the accompanying drawings in which—

Figure 3 is a cross sectional view through a portion of the wheel showing one of the bracket members attached thereto, Figure 4 is a fragmentary longitudinal sectional view through one of the lug members showing the means for adjustably holding the inner end of a spring, Figure 5 is a perspective view showing a portion of one of the bracket members secured transversely of the wheel, and Figure 6 is a detail sectional view illustrating the means for locking one of the slidable elements against movement.

Figure 1:
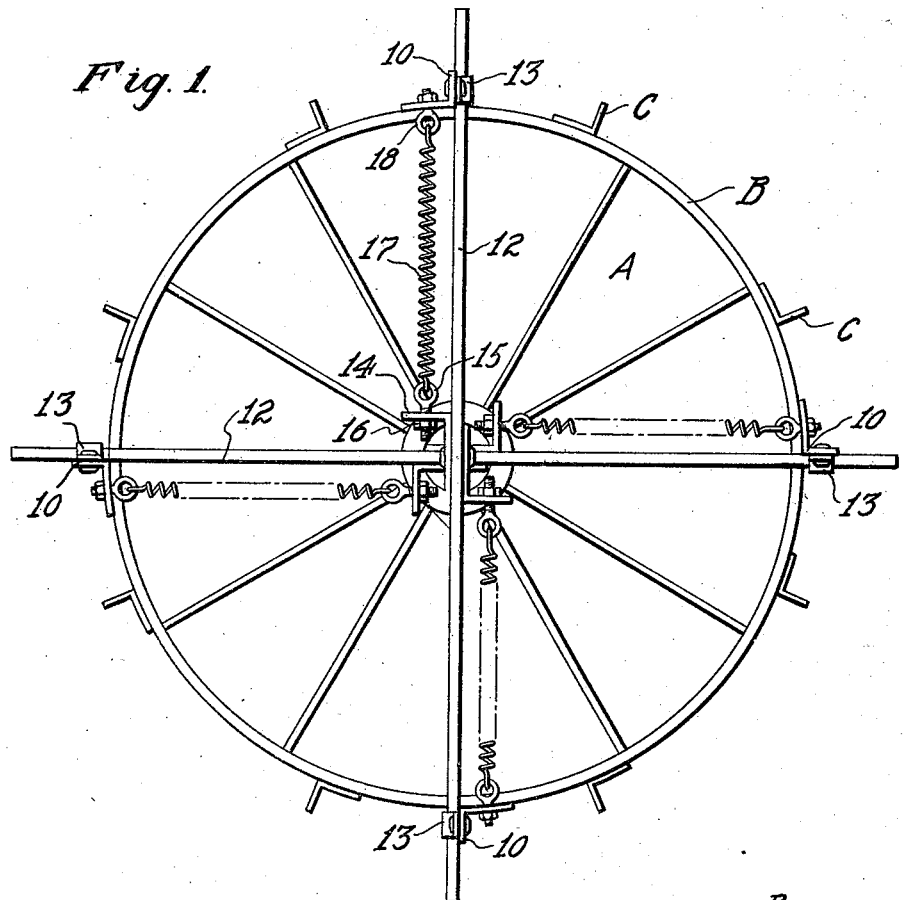
Figure 1 is a side elevation of the tractor wheel equipped with my device.
Figure 2:
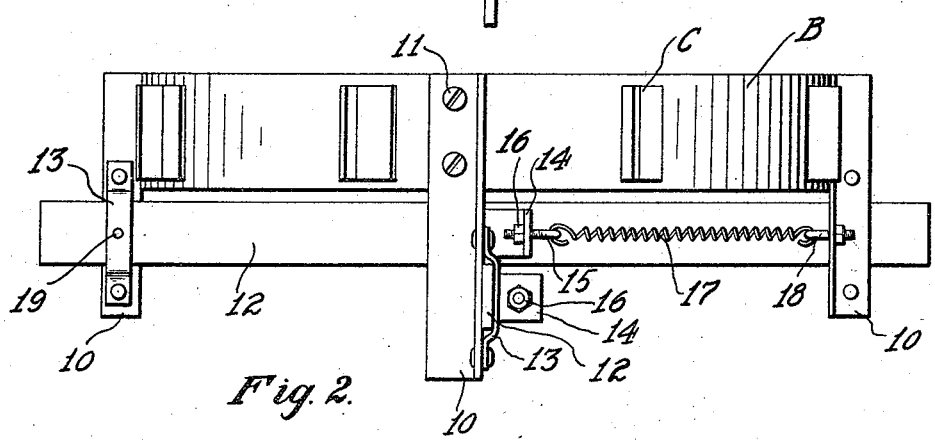
Figure 2 is a plan view thereof.

Referring more particularly to the drawings, the letter A designates a tractor wheel having the usual rim B provided with the ordinary transverse ribs C which are provided for purposes of insuring traction. As a matter of fact the spaces between these ribs become clogged when the tractor is driven over soft or muddy ground and the result is that the wheels slip. It is to remedy this defect that I have provided my traction lug device which includes a plurality, preferably four, angle iron bars 10 which are secured upon the periphery of the rim as by means of bolts 11 or the like. While bolts are shown it is conceivable that some suitable clamping means might be employed with equal advantage. These bars extend appreciably beyond one side of the wheel, as clearly shown in Figure 2.

Associated with opposite ones of the bars 10 are tractor lugs which are formed as elongated bars 12 of considerably greater length than the diameter of the wheel and the bars 12 are slidable through guide brackets 13 secured upon the bars 10, as shown. Secured upon each side of each bar 12, near the center thereof, or formed integrally upon the bar, is a right angularly extending bracket 14 through which extends an eye bolt 15 carrying an adjusting nut 16. Connected with each eye bolt is one end of the coil spring 17 which has its other end connected with a hook or eye 18 on the adjacent bar 10. It will thus be seen that each bar 12 is provided with two springs which operate to hold the bar 12 in an intermediate position with respect to the wheel but with both ends tending to project beyond the periphery of the wheel.

The outer end portions of the bars 10 and the outer end portions of the bars 12 are formed with registering holes 19 through which may be engaged a suitable pin or bolt whereby to hold the bars 12 rigid with respect to the wheel when desired.

In the operation of the device it will be seen that when a tractor equipped with my traction lugs is driven upon soft ground the ends of the bars 12 projecting beyond the wheel rim will penetratingly engage the ground owing to the tension of the springs 17 so that traction will be insured under even the most adverse circumstances. In case of striking a stone or hard spot of any kind it is apparent that the lugs may move inwardly or upwardly against the resistance of the springs so as to avoid injury to the lugs. In case of very soft ground it may be found advisable to pass bolts or pins through the holes 19 for holding the lugs rigid with respect to the wheel, in which event the springs 17 become inoperative.

From the foregoing description and a study of the drawings it will be apparent that I have thus provided a simply constructed and consequently inexpensive traction device which may be easily installed upon the wheel of a tractor without necessitating alterations therein, the device being highly effective and efficiently performing all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A tractor lug attachment for wheels comprising a plurality of bars secured upon the rim of the wheel and projecting beyond one side thereof, a plurality of bars extending transversely of the wheel and slidably associated with said first named bars and projecting beyond the periphery of the wheel, and springs connected with said first and last named bars for normally holding said last named bars in intermediate position.

2. A tractor lug attachment for wheels comprising a plurality of bars secured upon the rim of the wheel and projecting beyond one side thereof, a plurality of bars extending transversely of the wheel and slidably associated with said first named bars and projecting beyond the periphery of the wheel, and springs connected with said first and last named bars for normally holding said last named bars in intermediate position, said first and last named bars being formed with registering holes adapted to receive bolts or pins for holding the last named bars rigid with respect to the last named.

3. A traction lug attachment for tractor wheels comprising a plurality of angle bars secured upon the periphery of the wheel in transverse relation thereto and projecting beyond one face of the wheel, guide brackets carried by said bars, elongated bars slidable through the brackets on opposite ones of said first named bars and having their ends projecting normally beyond the periphery of the wheel, removable means for holding said last named bars rigid with respect to said first named bars, laterally extending brackets on each of said last named bars adjacent the central portions thereof, and springs adjustably connected with said last named brackets and connected with the adjacent ones of said first named brackets.

4. A tractor lug attachment for wheels comprising a plurality of bars secured upon the rim of a wheel and projecting beyond one side thereof, a plurality of bars extending transversely of the wheel and slidably associated with said first named bars and projecting beyond the periphery of the wheel, springs for normally holding said last named bars in intermediate position.

5. A tractor lug attachment for wheels comprising a plurality of bars secured upon the rim of a wheel and projecting beyond one side thereof, a plurality of bars extending transversely of the wheel and slidably associated with said first named bars and projecting beyond the periphery of the wheel, springs for normally holding said last named bars in intermediate position, and means for locking said slidable bars against movement.

In testimony whereof I affix my signature.

MATHIAS KRETCHMER.